United States Patent [19]

Hobson et al.

[11] 4,427,326
[45] Jan. 24, 1984

[54] TAMPER-RESISTANT LUG NUT

[75] Inventors: Stephan C. Hobson, Buffalo Grove; Kerry E. Stokes, Naperville, both of Ill.

[73] Assignee: Image Industries, Inc., Wood Dale, Ill.

[21] Appl. No.: 377,123

[22] Filed: May 11, 1982

[51] Int. Cl.³ .............................................. F16B 41/00
[52] U.S. Cl. ..................................... 411/5; 70/231
[58] Field of Search .................... 411/1, 2, 3, 4, 5, 6, 411/7, 8, 9, 371, 910; 70/229, 231

[56] References Cited

U.S. PATENT DOCUMENTS

| | | | |
|---|---|---|---|
| 1,870,427 | 8/1932 | Stallings et al. | 70/231 |
| 2,179,045 | 11/1939 | Lewis | 70/231 X |
| 3,191,486 | 6/1965 | Gibbens | 411/4 |
| 3,602,976 | 9/1971 | Grube | 411/2 |
| 3,667,339 | 6/1972 | Dame | 411/4 |
| 4,037,515 | 7/1977 | Kesselman | 411/910 X |
| 4,046,052 | 9/1977 | Nordstrom | 411/1 |
| 4,057,985 | 11/1977 | Stahl | 70/231 |
| 4,159,667 | 7/1979 | Nordstrom | 411/7 |

FOREIGN PATENT DOCUMENTS

| | | | |
|---|---|---|---|
| 516497 | 3/1930 | Fed. Rep. of Germany | 70/231 |
| 457645 | 5/1950 | Italy | 411/371 |
| 1144080 | 3/1969 | United Kingdom | 411/3 |

Primary Examiner—Thomas J. Holko
Attorney, Agent, or Firm—Donald E. Egan

[57] ABSTRACT

The present invention comprises a lug nut which has two separable portions connected by a frangible neck, wherein a first portion engages the threads of the stud, and a second portion provides a surface adapted to engage a wrench so that the lug nut may be driven into the stud. When the stud-engaging first portion has been threaded onto the stud and sufficiently tightened, continued application of torque cause the frangible, wrench-engaging second portion to shear off from the stud-engaging first portion. The stud engaging portion has an annular notch which is adapted to engage a snap ring located in the wrench-engaging portion. After the wrench-engaging portion is severed from the stud-engaging portion, the wrench-engaging portion is then reversed and positioned onto the stud-engaging portion. When so positioned, the snap ring engages the notch, which rotatably secures the wrench-engaging portion to the stud engaging portion. The wrench-engaging portion, thus acts as a cover or shroud for the stud-engaging portion, and being rotatable provides a tamper-proof cover for the stud-engaging portion.

4 Claims, 4 Drawing Figures

U.S. Patent  Jan. 24, 1984  4,427,326
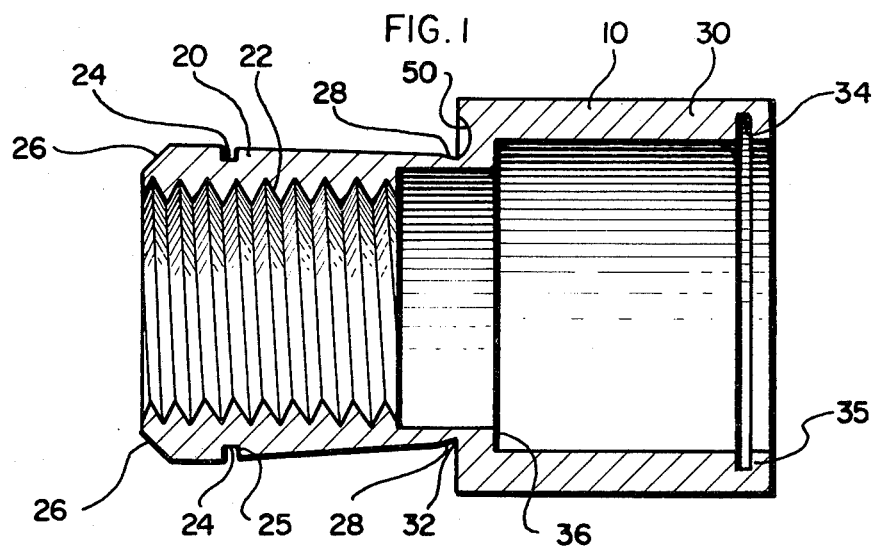
FIG. 1
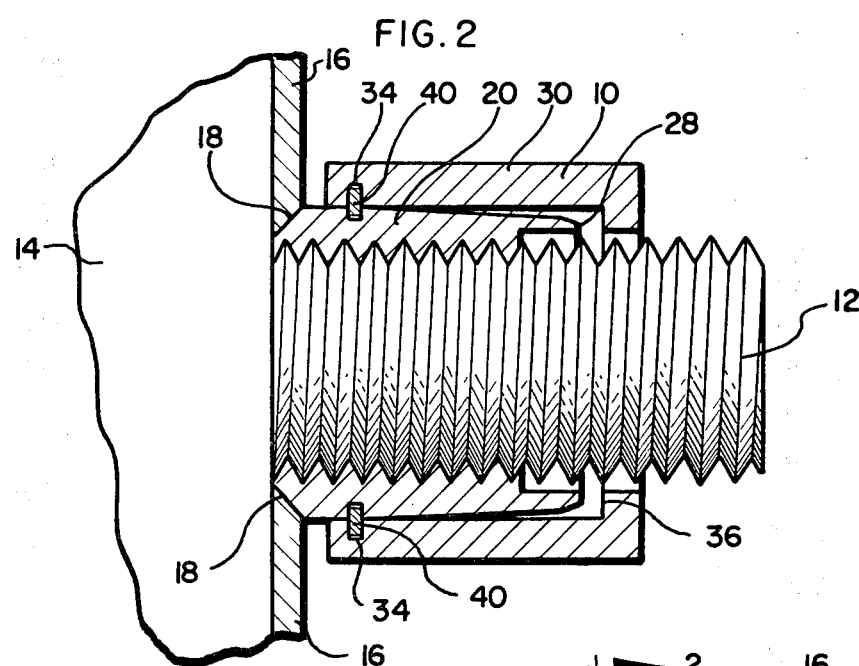
FIG. 2
FIG. 3
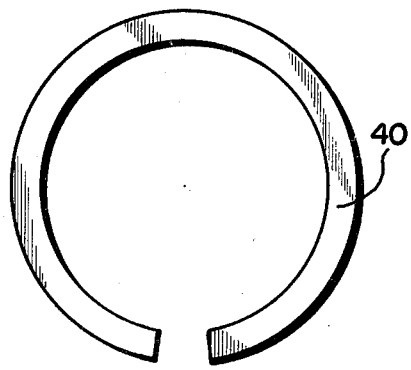
FIG. 4
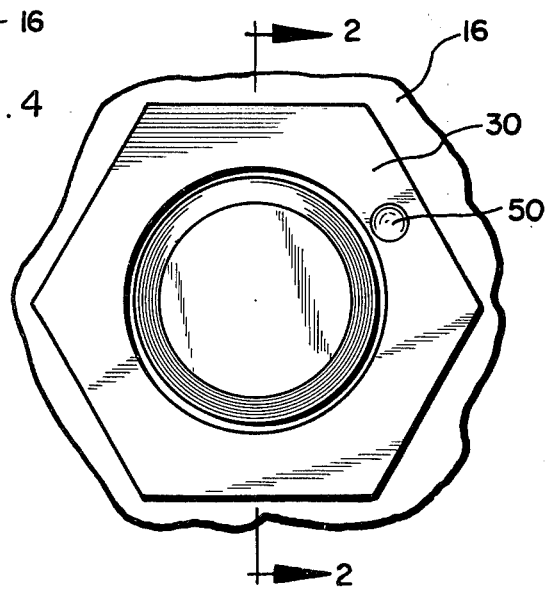

TAMPER-RESISTANT LUG NUT

BACKGROUND OF THE INVENTION

The present invention relates in general to tamper-resistant lug nuts and more particularly to tamper-resistant lug nuts designed to secure tires to trailers, trucks and other vehicles. The lug nuts of the present invention may be used to provide tamper-resistant security in other environments.

Whenever separable pieces of equipment are attached together by fasteners, such as tires which are attached to trailers for semi-tractor trucks, there is a possibility that unauthorized persons may remove the attached equipment. A common example of problems associated with such separable equipment is found in the theft of wheels and tires from trailers and truck bodies. If any tires, and including the spare tires can be readily separated from its mounting on the truck, the tires and wheels mounted thereon are more likely to be stolen. Other examples are found in bicycle racks, and motor mounts for boat motors. With the ever increasing costs of such equipment, it becomes still more important to provide a means for quickly, and positively locking pieces of separable equipment in a manner which resists the unauthorized removal thereof, but which permits removal by authorized users without undue struggle.

The prior art has suggested several approaches for fastening separable pieces of equipment together in a manner which purports to be tamper-proof. Such devices generally include a wrench gripping member which is connected to a stud-engaging portion by a frangible or breakable joint. In the application of the lug nut, the stud-engaging portion is threaded onto the stud and tightened to force the separable equipment to the main equipment and when sufficient torque is applied, usually via the wrench, the wrench-engaging portion fractures and shears off, leaving the stud-engaging portion in position. The stud-engaging portion is generally shaped to present a surface which is difficult to grasp with sufficient force to permit the stud-engaging portion to be separated from the stud. Such devices are shown in U.S. Pat. Nos. 1,696,523 and 3,978,761.

However, these prior art devices of the frangible-joint-type nut have a stud-engaging portion which remains exposed after the gripping member has been separated therefrom. Because of the exposed nature of the stud-engaging portion, persons can, given pliers or other equipment of the type usually found in automotive tool boxes, grip the stud-engaging portion with sufficient force to allow the removal of the member from the stud and thus defeat the tamperproof features of the prior art devices.

Other prior art workers have suggested that the frangible joint type lug nut be employed or be shaped in such a manner that the thread-engaging portion is shielded by a shroud-like member which extends above the break-off point so that the shroud prevents the stud-engaging portion from being turned to remove the stud-engaging portion from the stud. Such devices are shown in U.S. Pat. No. 4,037,515 and others. Although such devices are effective in preventing unauthorized removal, the devices similarly handicap the user when authorized removal is desired.

The present invention provides a tamperproof lug nut which can be simply removed, provided one has the appropriate tools and the requisite know-how.

SUMMARY OF THE INVENTION

The present invention comprises a lug nut which has two separable portions connected by a frangible neck, wherein a first portion engages the threads of the stud, and a second portion provides a surface adapted to engage a wrench so that the lug nut may be driven onto the stud, and when the stud-engaging first portion has been threaded onto the stud and sufficiently tightened, continued application of torque causes the frangible, wrench-engaging second portion to shear off from the stud-engaging first portion. The stud-engaging portion has an annular notch which is adapted to engage a snap ring located in the wrench-engaging portion. After the wrench-engaging portion is severed from the stud-engaging portion, the wrench-engaging portion is then reversed, and positioned onto the stud-engaging portion, to provide a rotatable cover for the stud-engaging portion. When so positioned, the snap ring engages the notch, which rotatably secures the wrench-engaging portion to the stud-engaging portion. The wrench-engaging portion, thus acts as a cover or shroud for the stud-engaging portion, and being rotatable provides a tamperproof cover for the stud-engaging portion.

When it is desired to remove the lug nut, a small hole is drilled parallel to the stud, at a position which passes through both the stud engaging portion and the wrench engaging portions and a pin is then placed in the drilled hole. The stud-engaging nut may then be removed by turning the wrench-engaging portion.

These advantages as well as other advantages, which will become subsequently apparent, reside in the details of construction and operation which are more fully hereinafter described and claimed, reference being had to the accompanying drawings forming a part hereof, wherein like reference numerals refer to like parts throughout.

BRIEF DESCRIPTION OF THE DRAWINGS

FIG. 1 is a side view, taken in section 1—1 of FIG. 4 of the right-hand thread embodiment of the tamper-resistant lug nut of the present invention prior to installation, as it would be sold;

FIG. 2 is a side view, partially cutaway, of the left-hand thread embodiment of the lug nut of the present invention, after installation, shown in its tamperproof mode;

FIG. 3 is an end view of the snap ring component of the lug nut of the present invention; and FIG. 4 is an end view of the tamperproof lug nut of the present invention.

DETAILED DESCRIPTION OF THE PREFERRED EMBODIMENT

As is shown in FIGS. 1 and 2, the tamperproof lug nut 10 is generally comprised of a stud-engaging first portion 20 which is initially attached to wrench-gripping second portion 30. FIG. 1 illustrates the nut, as it is manufactured, prior to installation with the stud-engaging portion 20 connected to the wrench-gripping portion 30.

In the preferred embodiment lug nut 10 is used to attach wheel 16 (or other equipment) to a truck or trailer wheel hub or body 14 through stud 12. As is shown in FIG. 1, stud 12 is a conventional right-hand thread stud with the threads on the exterior portion thereof. A left-hand thread embodiment is illustrated by FIG. 2. Although the drawings show the stud affixed to a vehicle wheel hub or body 14, stud 12 may be affixed to any fixed object. In the preferred embodiment, stud 12 protrudes through the stud opening 18 in the wheel 16. The stud opening 18 may be bossed, coined, or tapered, depending upon the type of wheel being mounted.

The wheel 16 is held in place on the stud 12 by the stud-engaging portion 20 which includes on its interior surface stud-engaging threads, 22 which are right-hand threads adapted to mate with the threads of the stud 12. Stud-engaging portion 20 also includes an annular notch 24 on its exterior surface.

The annular notch 24 preferably includes an outer surface 25 which is normal to the axis of threads 22. The shape of the opposing surface is not critical. The notch 24 may be placed at any convenient locations along the outer surface of thread engaging portion 20.

Shoulder 26 on stud-engaging portion 20 abuts wheel 16 in the secured position, to maintain the wheel 16 in its tamper-resistant position. Preferably shoulder 26 has a surface which is complementary to the surface presented by stud opening 18 on the wheel 16, in order to provide a substantial area of metal-to-metal contact and firmer support.

The opposite outer end of stud-engaging portion 20 is tapered shoulder 28 which joins with wrench-gripping portion 30 at frangible neck 32. Frangible neck 32 is fabricated to fracture at a readily achievable torque, which is high enough to tighten stud-engaging portion 20 on stud 12 and move the wheel into a secured position, but when the designed torque is reached, a fracture occurs at frangible neck 32, separating the wrench-engaging portion 30 from the stud-engaging portion 20.

As is shown in FIGS. 1 and 2, the wrench-engaging portion 30 has an exterior of hexagonal shape adapted to fit conventional lug wrenches. The interior of portion 30 comprises a generally cylindrical opening, large enough to fit over stud-engaging portion 20. Annular notch 34 is located on the interior surface of wrench-engaging portion 30. The outermost surface 35 of annular notch 34 in preferably normal to the axis of the threads 22. Snap ring 40, shown in FIG. 4, is adapted to engage annular notch 34 in portion 30 and to also engage annular notch 24 in portion 20. The snap ring 40 may be positioned in either of the annular rings 24 or 34 initially. The size of the snap ring 40 must be selected to maintain ring 40 in the notch initially selected (either 24 or 34) and to expand or compress, as required when portion 30 is placed over portion 20 and thus engage in the second annular notch. As snap ring 40 engages both notches 24 and 34, the wrench-engaging portion 30 is rotatably locked in position over stud engaging portion 20. This permits the wrench-engaging portion 30 to be rotated without loosening the stud-engaging portion 20 and prevents unauthorized removal of the lug nut.

The wrench-engaging portion 30, preferably has an inward projection 36 which extends inwardly beyond function of the outer diameter of threads 22, and thus cover the junction of portion 20 and portion 30 when the wrench-gripping portion is reversed.

In the preferred embodiment, as is shown in FIGS. 1 and 4, drill spot 50 is embossed or otherwise marked on the outer surface of inward projection 36. Although drill spot 50 may be omitted for security purposes, it is preferred for ease of stud removal. The use of drill spot 50 facilitates the drilling of a hole parallel to the stud and aligned to the junction of the stud-engaging portion and the wrench-engaging portion. A pin, approximately the same size as the hole drilled, is inserted in the hole and the lug nut is removed in a conventional manner thereafter.

The lug nut of the present invention is used in the following manner:

The stud-engaging portion 20 of lug nut 10, as shown in FIG. 1, is threaded onto stud 12 in a manner to secure the wheel 16 to the frame of the vehicle 14. The lug nut is tightened, by driving wrench-gripping portion 30 until the wheel 16 is secured against the frame of the vehicle 14. A twisting torque is further applied by a wrench through wrench-gripping portion 30 until fracture occurs at frangible neck 32. The wrench-gripping portion 30 of the nut is then reversed and positioned onto the stud-engaging portion 20 as is shown by FIG. 2. As portion 30 is placed over prtion 20, snap ring 40 engages notch 24, which rotatably secures over stud engaging portion 20.

In this condition, any further turning or rotation wrench-engaging portion 30 will neither tighten nor loosen the stud-engaging portion 20, but the wheel will remain in place. The wheel may be removed by drilling a small hole, for example, one-eighth inch in diameter, at drill spot 50 in alignment with the junction of portion 20 and portion 30. A small pin, for example, a nail, is inserted in the drilled hole, and the lug is removed with a wrench in a conventional manner.

In the preferred embodiment, the tamper-resistant lug nut is fabricated from an aluminum bronze alloy, because such alloys are difficult to cut using a torch. Other materials of construction may also be used.

The forms of invention herein shown and described are to be considered only as illustrative. It will be apparent to those skilled in the art that numerous modifications may be made therein without departure from the spirit of the invention or the scope of the appended claims.

What is claimed is:

1. A tamper-resistant lug nut comprising:
  a first portion of generally cylindrical shape, said first portion having threads on interior surface, said threads being adapted to engage the threads of a standard stud, said first portion having an annular notch on the exterior surface thereof;
  a second portion removably affixed coaxially to said first portion, said second portion having a generally hexagonal exterior and a generally cylindrical coaxial opening, the interior surface of said opening comprising an annular notch, said first portion being affixed to said second portion in a manner that upon application of an effective amount of torque the portions fracture and separate at the point of union, said second portion adapted to be reversed in attitude after separation and engaged over said first portions; and
  a snap ring associated with said annular notches and adapted to cooperate with said notches to rotatably affix said second portion over said first portion.

2. A tamper-resistant lug nut as described in claim 1, wherein said second portion has an inward projection or collar adapted to extend radially inward over the junction of the first portion and the second portion when said second portion is engaged to said first portion.

3. A tamper-resistant lug nut as described in claim 1 wherein said snap ring is positioned in the annular notch of said first portion.

4. A tamper-resistant lug nut as described in claim 1 wherein said snap ring is positioned in the annular notch of said second position.

* * * * *